June 17, 1924
M. PEMBER
ELECTRIC HEATER
Filed July 27, 1922
1,497,790
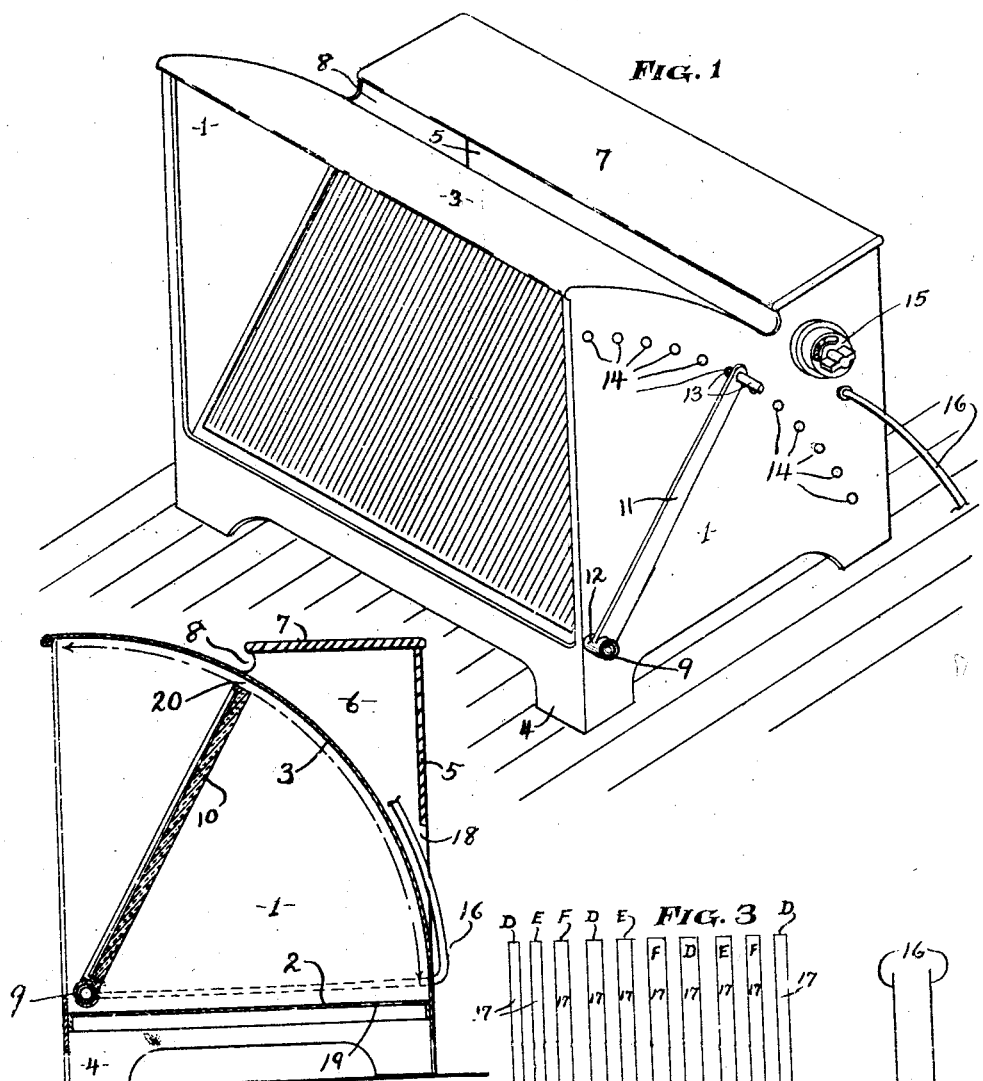
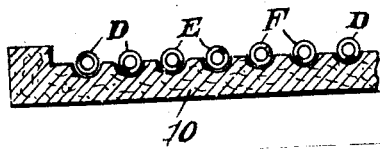
INVENTOR.
Myrtle Pember
BY
U. T. Charles
ATTORNEY.

Patented June 17, 1924.

1,497,790

UNITED STATES PATENT OFFICE.

MYRTLE PEMBER, OF WICHITA, KANSAS.

ELECTRIC HEATER.

Application filed July 27, 1922. Serial No. 577,856.

*To all whom it may concern:*

Be it known that I, MYRTLE PEMBER, a citizen of the United States, and resident of Wichita, in the county of Sedgwick and State of Kansas, have invented certain new and useful Improvements in Electric Heaters, of which the following is a specification.

My invention relates to portable or stationary electric heaters for domestic use, and has for its principal object a plurality of heating elements that can be turned on in series.

Another object of my invention is to reflect the heat from the back wall of the heating element housing. And a further object is a provide a heating element pivotally mounted for the purposes hereinafter described.

Referring to the accompanying drawings, Figure 1 is a perspective view of the heater complete.

Figure 2 is a sectional view of Figure 1.

Figure 3 is the wiring diagram. Fig. 4 is a fragmentary sectional detail showing corrugations on apron. 1 is the end walls of the heater, 2 is the floor, 3 is the current back, 4 are the legs, 5 is the back wall of the heat chamber 6, 7 is the top, 8 is an elongated exit through which the heat flows from heat chamber 6. The above constitute a housing for my electrical heating devices. 9 is a hollow shaft trunnioned in the end walls 1, and to said shaft is rigidly attached an apron 10 which is made of asbestos or other fire resisting material and also an insulator for electric current, and on said apron are mounted in corrugations A, wires as heating members, 11 is a crank which is rigidly attached to one end of shaft 9 as shown at 12, said crank being adapted to rotate apron 10 to the desired angle and hold said apron in a fixed position by a pin 13 entering perforations 14, said pin being long enough to extend outward, functioning as a handle for said crank 11. It will be understood that crank 11 will spring sufficient to withdraw the pin 13 from the perforations 14, and also have tension enough to cause said pin to enter and remain in said perforation, holding the apron 10 rigidly in position.

15 is the switch to control the electric current as hereinafter described, 16 is the feeders which connects to the switch and heat units and said feeder will pass through the hollow shaft 9 and connect with the heat units as shown in wiring diagram Figure 3.

In Figure 3, 15 is a one two three electric switch but may be increased or decreased according to the number of heat series required. 16 is the feeders, 17 are the heating units, 18 is the series feed wires to the heating units.

When the switch connects circuit A heat units D are heated and when turned on to B units D and E are heated and when turned on to C units D, E and F are heated. This completes the series as shown in the wiring diagram Figure 3, and by further rotation of the switch to the position as shown on the switch in said diagram all of the heating elements are cut out, and the object of this system of wiring is to secure the amount of heat required by series of units and not turn on the entire system unless required for a greater amount of heat.

When the heat units become red hot and also the apron 10, a reflection from the circular back will intensify the heating capacity and by raising or lowering the heating elements as heretofore described the radiation may be varied.

One of the principles of my heater, is that when the heating elements are set in action a circulation of air will start taking the cold air from or near the floor level, passing in at an opening 18 at the back and passing out at opening 8 at the top, and also through an opening 19 and out around the edges of apron 10 as approximately shown at 20 and this space exists no matter what angle the apron may be stationed at.

Such modifications may be employed as lie within the scope of the appending claims and what I claim as new and desire to secure by Letters Patent is:—

1. In an electric heater the combination of a housing a pivotally mounted apron with electric heat members placed thereon, means for oscillating and stationing said apron at a desired angle, an electric wiring system with means for switching on and off said electric current for the purposes set forth and described.

2. In an electric heater, the combination of a housing, a pivotally mounted apron, said apron having grooves to receive heating elements, a crank attached to apron shaft and on the opposite end of said crank a pin protruding and adapted to engage perforations by which means said apron is placed at a desired angle and held firmly, an electric wiring system, a plurality of heat units circuited in series, a switch controlling said series for the purposes set forth and described.

3. In an electric heater, the combination of a housing mounted on legs, air circulating means a circular back as reflecting element, a heat unit apron and heating means, said apron having a shaft being hollow to receive electric cable and said cable adapted to feed heat units stationed in the corrugations on face of said apron, said apron raised and lowered by means of a crank on the exterior of said housings, said crank having a pin functioning as a handle and stop for setting the apron at any desired angle for the purposes set forth and described.

MYRTLE PEMBER.